US005603150A

United States Patent [19]
Assink et al.

[11] Patent Number: 5,603,150
[45] Date of Patent: Feb. 18, 1997

[54] UPHOLSTERING APPARATUS

[75] Inventors: Kenneth Assink, Holland; Mark J. Feenstra, Grand Haven, both of Mich.

[73] Assignee: J. R. Automation Technologies, Inc., Holland, Mich.

[21] Appl. No.: 378,664

[22] Filed: Jan. 26, 1995

[51] Int. Cl.$^6$ .............................. B68G 15/00; B68G 7/00; B29C 65/18

[52] U.S. Cl. ........................... 29/91.8; 29/91.1; 29/91.5; 29/91.6; 29/448; 156/228; 156/475; 156/485

[58] Field of Search .................................... 29/91.1, 91.5, 29/91.6, 91.7, 91.8, 281.4, 448; 156/228, 229, 475, 477.1, 485, 212

[56] References Cited

U.S. PATENT DOCUMENTS

| | | | |
|---|---|---|---|
| 3,318,636 | 5/1967 | Callum | 156/212 X |
| 3,325,329 | 6/1967 | Bolesky | 29/91.1 X |
| 3,438,108 | 4/1969 | Nash | 29/448 X |
| 3,643,308 | 2/1972 | Yamamoto | 29/91.1 |
| 4,718,153 | 1/1988 | Armitage et al. | 29/91.1 |
| 4,795,517 | 1/1989 | Elliott et al. | 29/91.1 X |
| 4,818,331 | 4/1989 | Shimada | 156/485 |
| 4,876,448 | 10/1989 | Uraci | 156/228 X |
| 4,908,084 | 3/1990 | Assink | 156/475 X |
| 5,287,610 | 2/1994 | Gomolak et al. | 29/91.8 X |

FOREIGN PATENT DOCUMENTS

| | | | |
|---|---|---|---|
| 6-015069 | 1/1994 | Japan | 29/91.1 |
| 695069 | 8/1953 | United Kingdom | 29/91.8 |

OTHER PUBLICATIONS

Exhibit A discloses an exemplary prior art device at one time manufactured by J. R. Automation the assignee of the present invention. The device includes a nest, and a plurality of fold plates, each actuatable by an air cyclinder along a single horizontal direction around a perimeter of the nest.

Primary Examiner—Peter Vo

[57] ABSTRACT

An upholstering apparatus is provided including a frame, a work-supporting plate operably mounted on the frame including a nest configured to support a sheet of upholstery material, especially fabric, and a substrate. A clamp on the frame is configured to rubbingly press the substrate against the upholstering material. In a first embodiment, a plurality of edge fold assemblies are located around the nest, each including a first subassembly having an edge fold blade operably attached to the work-supporting plate, and a second subassembly operably attached to the clamp for engaging the edge fold blade. A first actuator is operably connected to the edge fold blade to extend the blade into contact with the edge of the upholstery material to press the edge of the upholstery material against the substrate, and a second actuator is operably connected to the clamp to press the edge fold blade against the upholstery material edge and the substrate for two dimensional complex movement as the edge fold blade is moved around onto the back surface of the substrate. A controller attached to the actuators controls the sequential actuation of the actuators so that the upholstering apparatus is automatically operated for optimal performance. In a second embodiment, heaters are movably connected to the clamp to heat a strip along a back edge of a polymeric structural member to create a fluidized film on the back surface so that, when edge fold blades press a sheet of material against the back edge, the fluidized film of bonds the sheet of material to the structural member as the fluidized film cools.

13 Claims, 12 Drawing Sheets

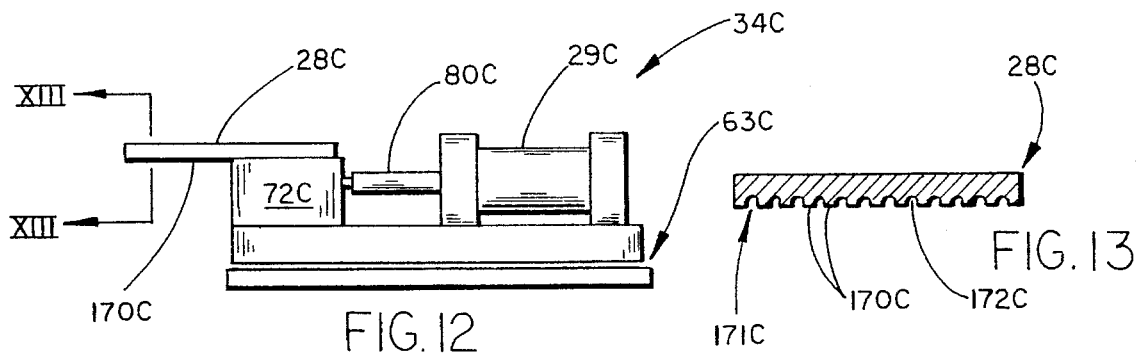
FIG. 12
FIG. 13
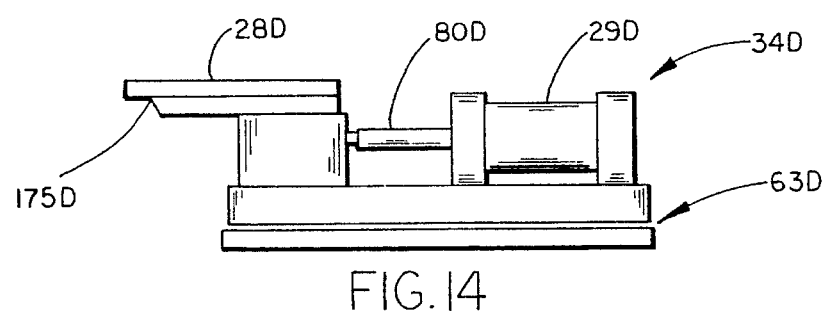
FIG. 14
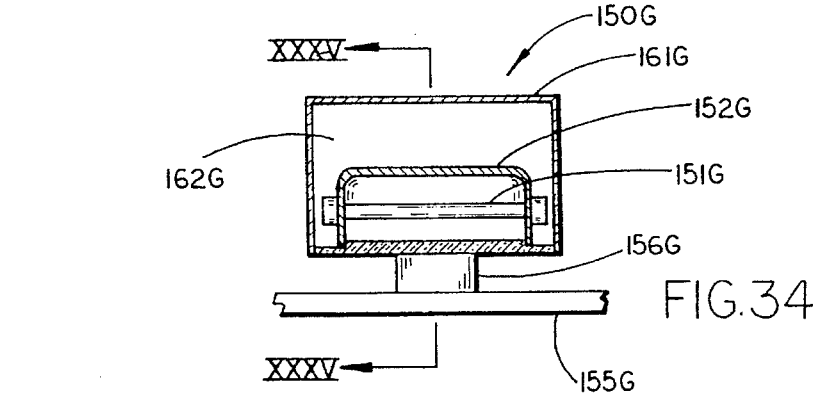
FIG. 34
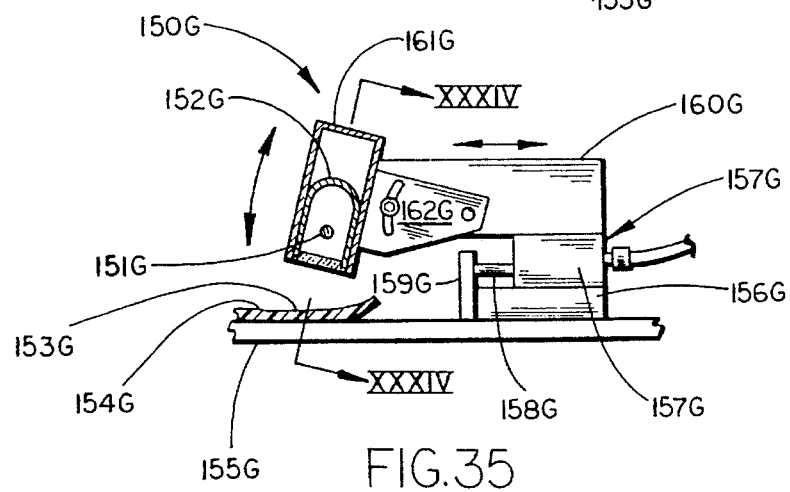
FIG. 35

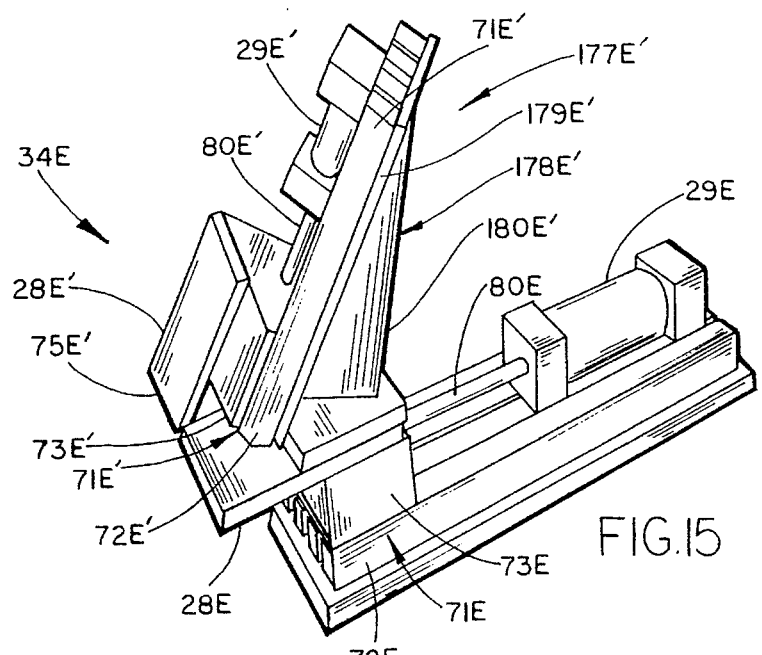
FIG.15
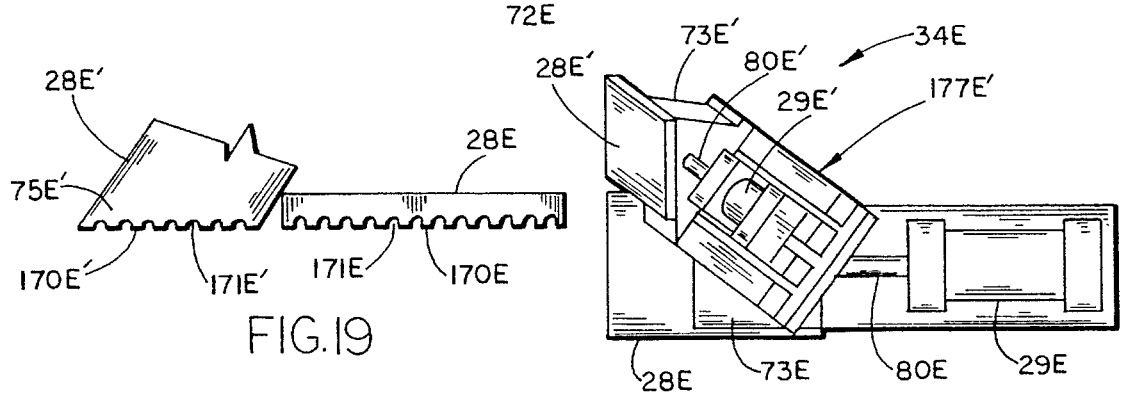
FIG.19
FIG.16
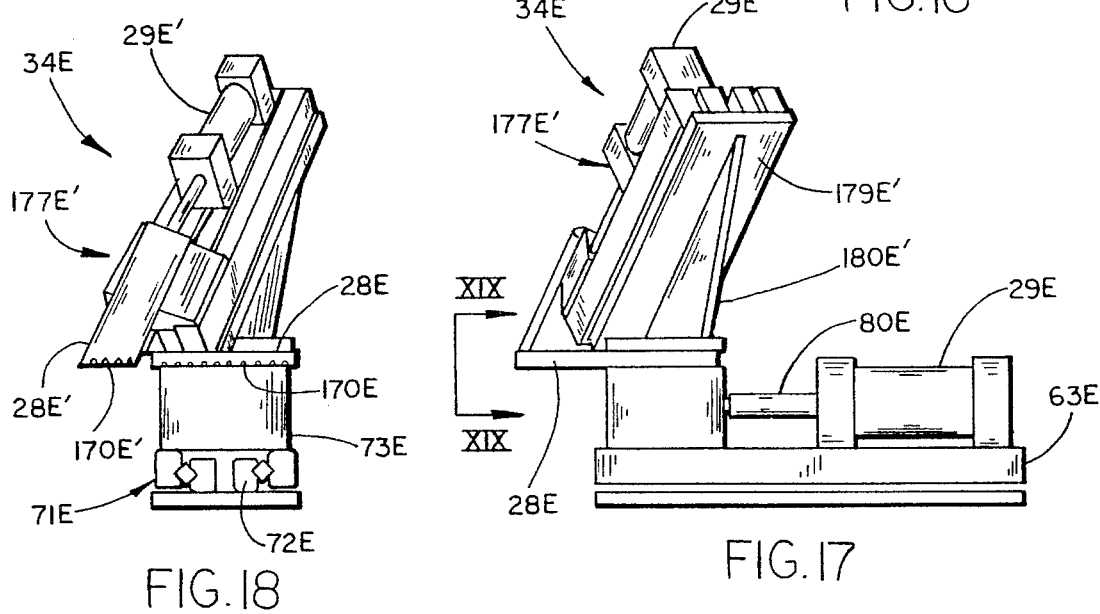
FIG.18
FIG.17

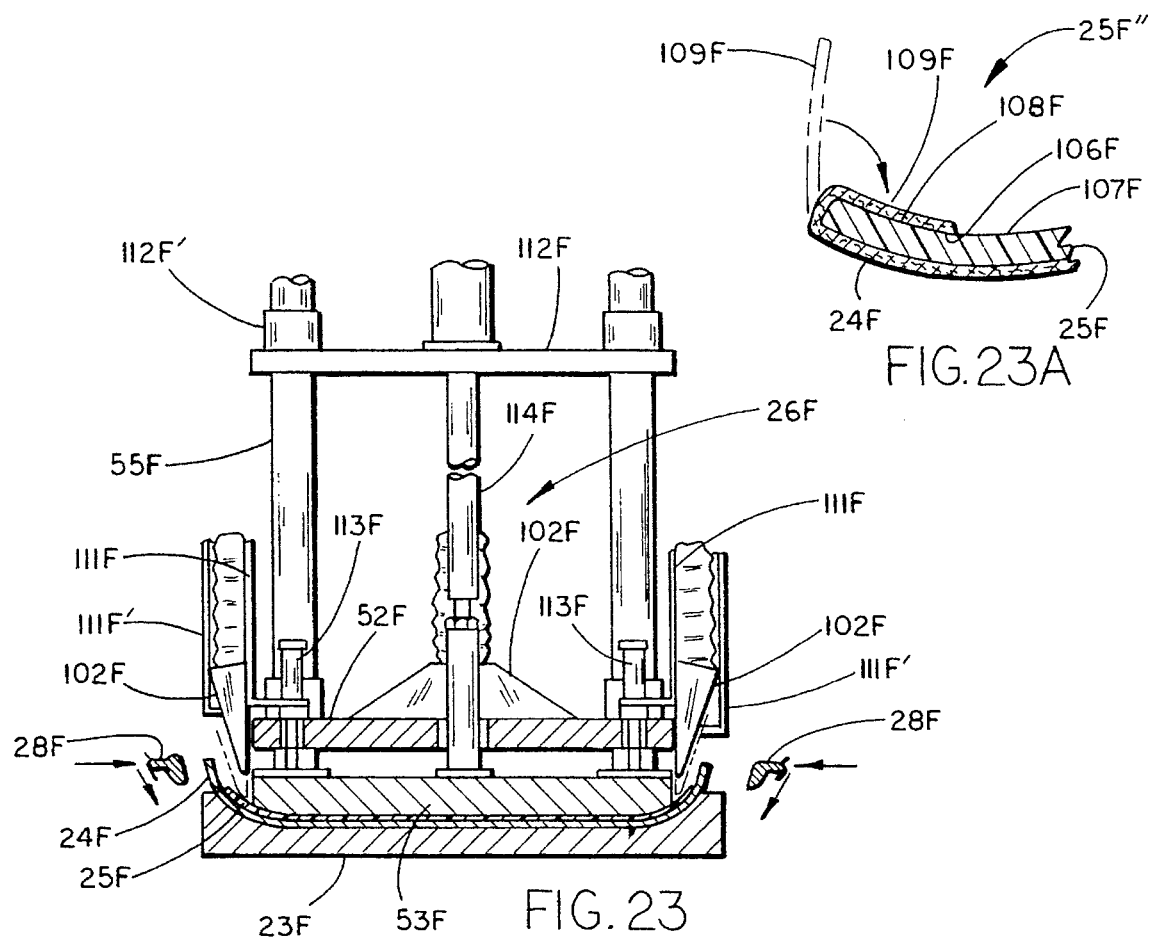
FIG. 23A
FIG. 23
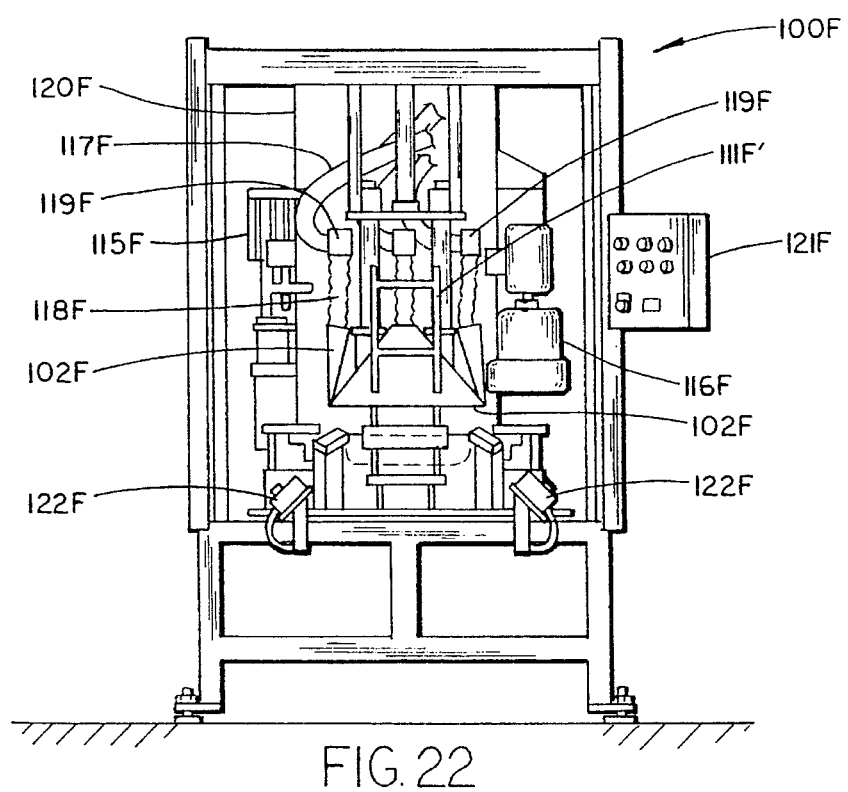
FIG. 22

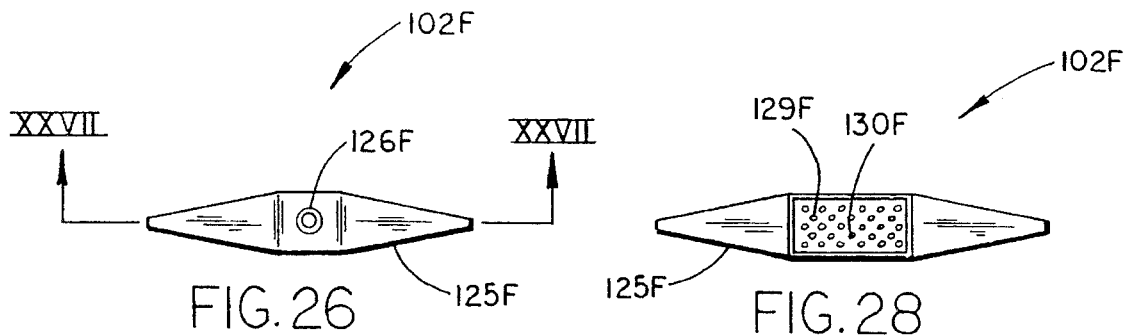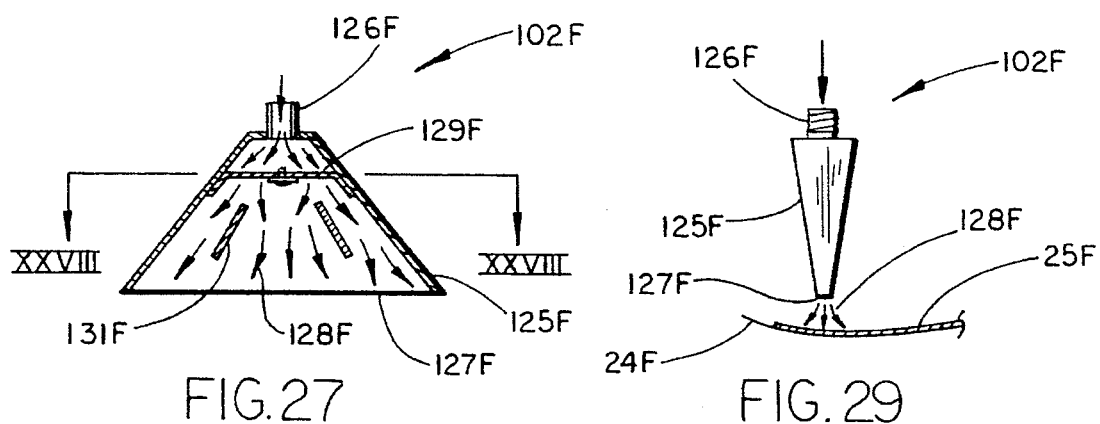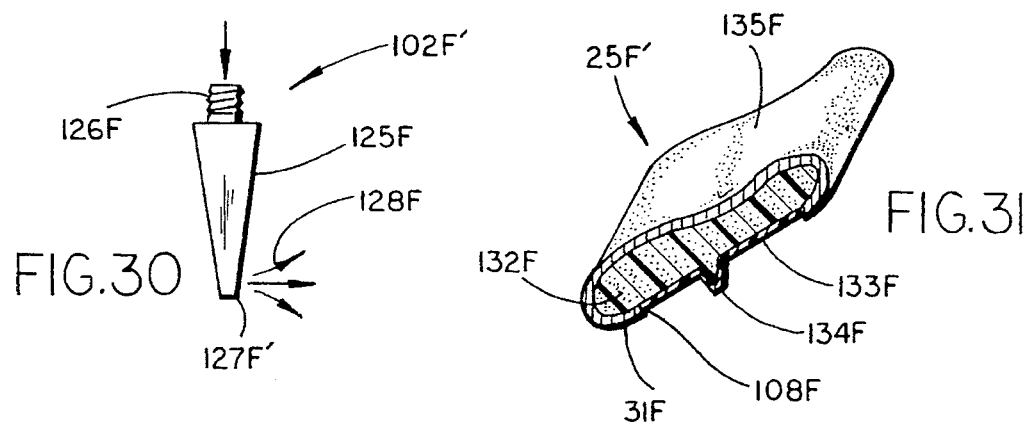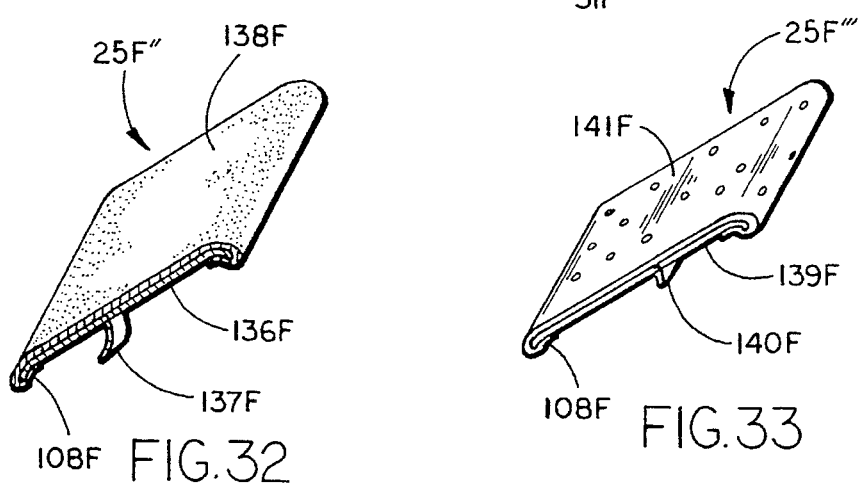

UPHOLSTERING APPARATUS

BACKGROUND OF THE INVENTION

The present invention concerns an upholstering apparatus, and more particularly concerns an apparatus for applying upholstery to a part. It is very important to assemble upholstery and covering materials to covered structural parts, such as chairs, automotive door panels and the like, in a consistent manner so that there are no unsightly random wrinkles or creases in the covering materials. Historically, the assembly has been done manually, particularly on chairs or seats since it is difficult for a machine to adequately compensate for normal variations in chair seat substrates, chair seat cushions, and fabrics/covering materials. At least one manufacturer has attempted to solve this problem by redesigning the chair seat substrate to allow automated attachment of the edge of the upholstery/covering material to the seat substrate, but with limited success. Thus, the process of assembling upholstery/covering material to chairs has been and continues to be labor intensive.

Another problem is that adhesive coatings, whether applied by spraying or applied in the form of a manipulatable separate sheet, are expensive to apply. Specifically, it can be undesirably expensive to melt or cure the adhesive to adhere the upholstery material to the substrate. Still further, spraying adhesive can be very messy and the strength of adhesive bonding and overall quality of the end product difficult to control. Yet another problem is emissions from the adhesive as it is cured.

Thus, an automated upholstering apparatus solving the aforementioned problems and which is compatible with existing part designs is desired.

SUMMARY OF THE INVENTION

The present invention includes an upholstering apparatus for pressing edges of a sheet of upholstery material onto corresponding edges of a substrate to manufacture an article. The upholstering apparatus includes a support including a nest configured to support a sheet of upholstery material and a substrate on the sheet of upholstery material with edges of the material extending laterally from a perimeter of the nest. A clamp presses the substrate against the nest on support. A plurality of edge fold assemblies are located around the nest, each edge fold assembly including an extendable edge fold blade operably mounted for two dimensional movement. First and second actuators are actuatable to extend the edge fold blade against a perimeter of the substrate and thereafter continuously press the edge fold blade against the perimeter with a predetermined amount of pressure as the edge fold blade is rubbed generally perpendicularly to the perimeter around onto a selected one of the opposing sides of the substrate.

In another aspect, an upholstering apparatus includes a support for supporting a polymeric structural member, and a clamp configured to hold the polymeric structural member on the support. The apparatus further includes a heater configured to rapidly heat a surface of the polymeric structural member to form a fluidized film thereon, one of the support and the heater being movably supported for movement between a heating position wherein the heater is located at least partially over the support and the polymeric structural member positioned thereon, and a retracted position. An edge fold blade is provided on the apparatus for pressing portions of sheet material against the surface of the polymeric structural member so that the film on the surface of the polymeric structural member engages and then adheres to the sheet material as the film on the surface solidifies from the fluid state.

These and other features, advantages and objects of the present invention will be further understood and appreciated by those skilled in the art by reference to the following specification, claims and appended drawings.

BRIEF DESCRIPTION OF THE DRAWINGS

FIG. 12 is a side view of a fourth preferred embodiment edge fold blade assembly, the blade assembly having a grooved blade;

FIG. 13 is a cross section taken along line XIII—XIII in FIG. 12;

FIG. 14 is a side view of a fifth preferred embodiment edge fold blade assembly, the blade assembly having a configured "offset" blade;

FIG. 15 is a perspective view of a sixth preferred embodiment edge fold blade assembly, the blade assembly having a secondary blade and secondary blade actuator;

FIGS. 16–18 are top, front and side orthogonal views of the edge fold blade assembly shown in FIG. 15;

FIG. 19 is an end view taken in the direction of line XIX—XIX in FIG. 17;

FIG. 22 is an elevational front view of the upholstering apparatus shown in FIG. 20, the clamp being in the lowered clamping position;

FIG. 23 is an enlarged fragmentary elevational view of the upholstering apparatus shown in FIG. 22, the hot air dispenser being shown in solid lines in a raised position and being shown in phantom lines in a lowered heating position, the edge fold blades being shown in the retracted position;

FIG. 23A is a fragmentary cross-sectional view of an edge of a substrate with the sheet material adhered to the substrate by a resolidified film of substrate material and without the use of adhesive;

FIG. 26 is a top view of a hot air dispenser;

FIG. 27 is a cross section taken along line XXIX—XXIX in FIG. 26;

FIG. 28 is a cross section taken along line XXX—XXX in FIG. 27;

FIG. 29 is a side elevational view of the hot air dispenser shown in FIG. 26;

FIG. 30 is a side elevational view of a modified hot air dispenser comparable to the hot air dispenser shown in FIG. 29, but having a modified outlet facing laterally;

FIG. 31 is a fragmentary cross-sectional view of a chair seat including a thermoplastic structural pan, a foam cushion, and an upholstery sheet material with edges adhered to the pan, the material edges being bonded to the pan by melted and resolidified polymer on the pan;

FIG. 32 is a fragmentary cross-sectional view of an automotive door panel including a polymeric structural member and a fabric sheet material adhered to the polymeric structural member by melted and resolidified polymer on the structural member;

FIG. 33 is a fragmentary cross-sectional view of an automotive door panel including a polymeric structural member and a perforated vinyl covering material adhered to the polymeric structural member by melted and resolidified polymer on the structural member;

FIG. 34 is a cross-sectional front view taken along the line XXXVI—XXXVI in FIG. 35 showing an infrared heating apparatus including a movable infrared lamp and a parabolic reflector for rapidly heating the surface of a polymeric substrate in preparation for adhering sheet material to the surface; and FIG. 35 is a cross-sectional side view taken along the line XXXVII—XXXVII in FIG. 34 showing the infrared heating apparatus and a substrate positioned under the infrared heating apparatus.

DETAILED DESCRIPTION OF PREFERRED EMBODIMENTS

Figure 1:
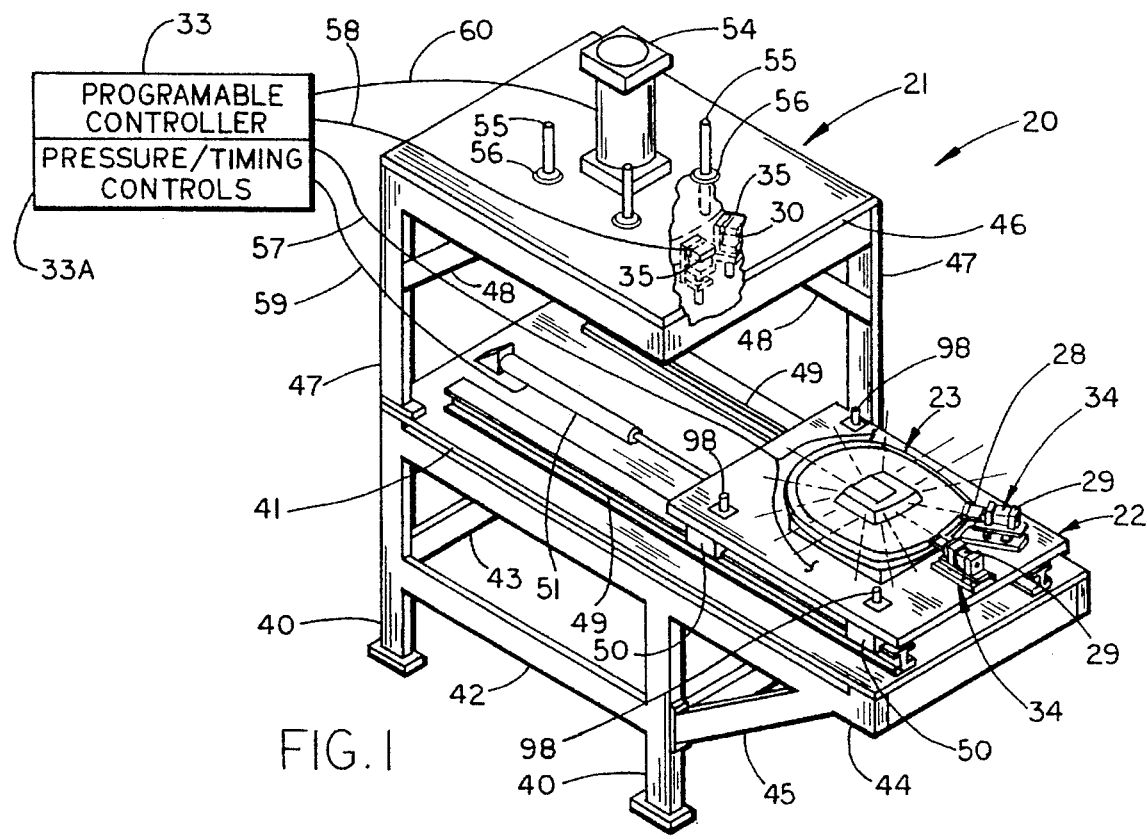
FIG. 1 is a perspective view partially broken away showing an upholstering apparatus embodying the present invention, the nest of the apparatus being shown in an extended loading and unloading position.
Figure 2:
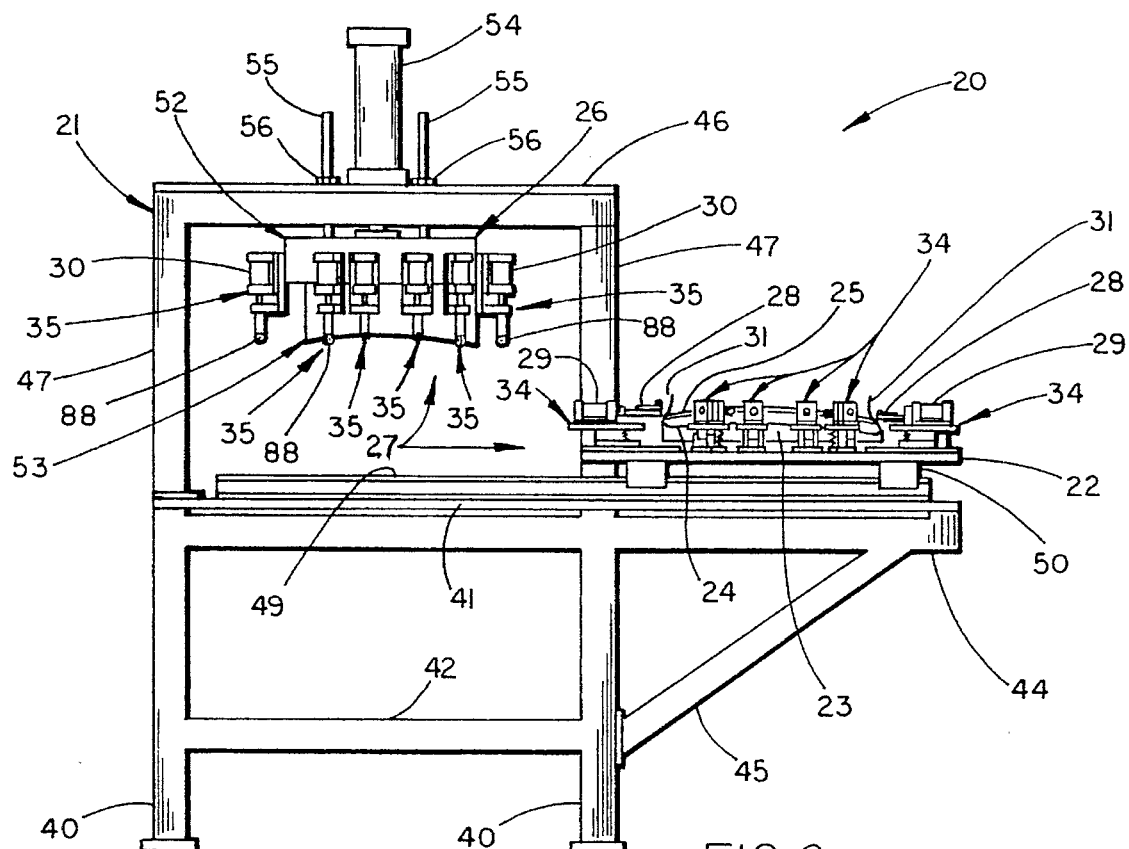
FIG. 2 is a side view, partially broken away, of the upholstering apparatus shown in FIG. 1.
Figure 4:
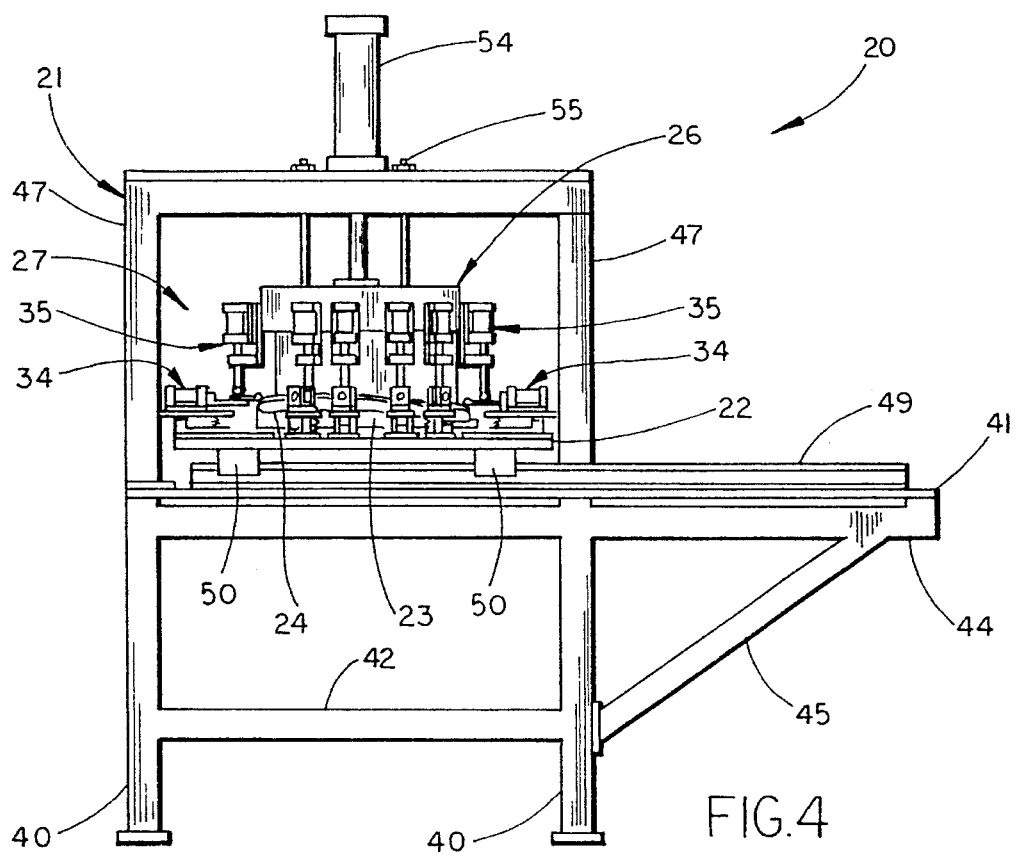
FIG. 4 is a side view, partially broken away of the upholstering apparatus shown in FIG. 3, the clamp being shown in a clamped position.
Figure 6:
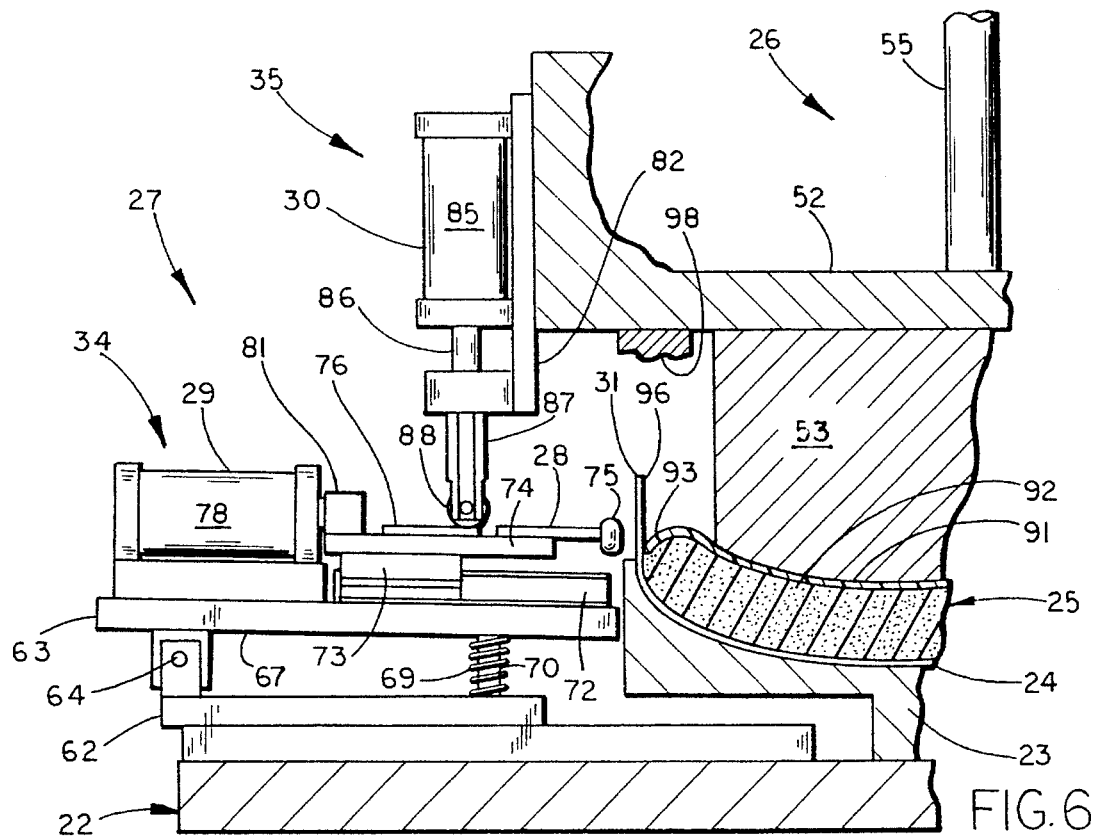
FIG. 6 is an enlarged fragmentary side view of the one edge fold blade assembly shown in FIG. 5, the clamp being shown in the clamped position.

An upholstering apparatus 20 (FIGS. 1–2) of a preferred embodiment includes a frame 21, and a work-supporting plate 22 operably mounted on the frame 21 including a nest 23 configured to support a combination including a sheet of upholstery material such as fabric 24 and a substrate 25 on the sheet of fabric 24 (FIG. 2). A clamp 26 is operably attached to the frame 21 and is configured to press the substrate 25 against the nest 23 (FIGS. 4 and 6). A plurality of edge fold assemblies 27 are located around the nest 23. Specifically, each edge fold assembly 27 (FIG. 6) includes a first subassembly 34 operably attached to work-supporting plate 22 having an extendable edge fold blade 28 operably mounted for two dimensional movement, and a second subassembly 35 operably attached to clamp 26 for engaging edge fold blade 28. A pair of actuators 29 and 30 are provided for each subassembly, the first actuator 29 being operably attached to the work-supporting plate 22 and being configured to extend the edge fold blade 28 laterally into contact with the edge 31 of the fabric 24 to press the edge 31 of the fabric 24 against the substrate 25. The second actuator 30 is operably connected to the clamp 26 to press the edge fold blade 28 generally downwardly against the fabric edge 31 and the substrate 25 as the edge fold blade 28 is moved around onto the back surface 32 of the substrate 25. The edge fold blades 28 are configured to consistently form the fabric 24 onto the substrate 25 for a repeatable and aesthetically tight fit as the fabric 24 is wrapped around the substrate edges 31. A controller 33 (FIG. 1) operably attached to the actuators 29 and 30 controls the sequential actuation of the actuators 29 and 30 individually so that the upholstering apparatus 20 can be semiautomatically or automatically operated in sequence for optimal performance.

Also, pressure and timing controls 33A are operably attached to controller 33 and lines 57–60 for controlling the timing and actuation pressure supplied to actuators 29 and 30.

More particularly, Frame 21 (FIG. 1) includes four legs 40 for supporting a lower platform 41. Cross braces 42 and 43 reinforce and rigidify legs 40. The from 44 of lower platform 41 extends in front of front legs 40, and is supported in a cantilevered position by diagonal braces 45. An upper platform 46 is supported above lower platform 41 by three upper legs 47. Additional legs (47) can be used if desired. Braces 48 reinforce and rigidify upper legs 47.

Figure 3:
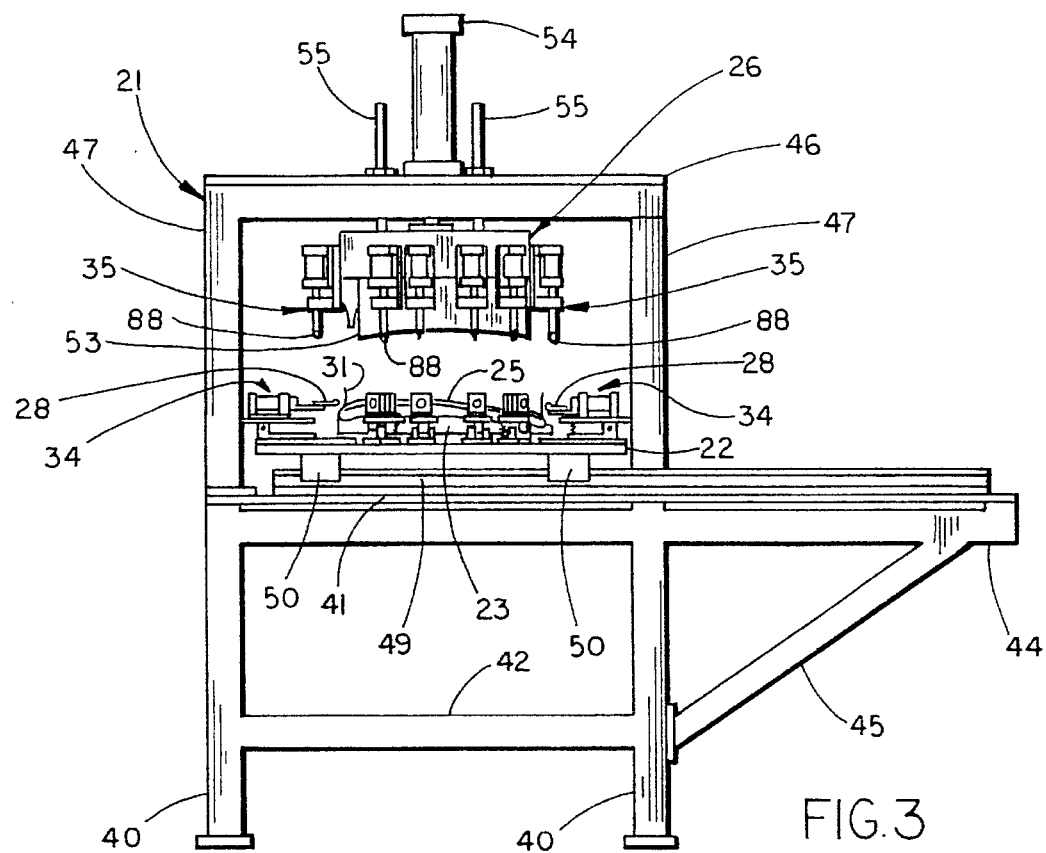
FIG. 3 is a side view, partially broken away, of the upholstering apparatus shown in FIG. 2, the nest and work-supporting plate being shown in a retracted, ready-to-clamp position.

Work-supporting plate 22 (FIG. 1) is slideably supported on lower platform 41 by a pair of parallel linear tracks 49 that extend from the front to the rear of the lower platform 41. Bearings 50 on work-supporting plate 22 slideably engage tracks 49 to movably support work-supporting plate 22, and an actuator 51 is provided for moving work-supporting plate 22 between a ready-to-load extended position (FIGS. 1–2) and a ready-to-clamp retracted position (FIG. 3). Nest 23 is attached generally centrally on work-supporting platform 41. A plurality of first subassemblies 34 are attached to work-supporting platform 41 around nest 23, with edge fold blades 28 of each assembly 34 extending generally perpendicularly toward and proximate the perimeter of nest 23. Any number of subassemblies 34 can be used. In FIG. 1, only two assemblies 34 are actually shown to simplify the figure; however, the radially extending center lines show the position of 16 such assemblies 34.

Clamp 26 (FIG. 2) includes a movable platen-like structure 52. A pressure and locating fixture 53 is attached to platen-like structure 52 and is configured to matingly engage substrate 25 and compress substrate 25 and fabric 24 against nest 23. A clamp actuator 54 is operably attached to upper platform 46 for raising and lowering platen-like structure 52. Guide rods 55 are connected to platen-like structure 52 and slideably engage linear bearings 56 for guiding the vertical movement of structure 52. The programmable controller 33 (FIG. 1) is operably connected to actuators 29, 30, 51 and 54 by compressed air lines 57–60, respectively, to control the sequence of operation of upholstering apparatus 20. It is contemplated that controller 33 will control the timing and speed of actuation of actuators 29 and 30 individually so that an optimal process can be achieved.

Figure 5:
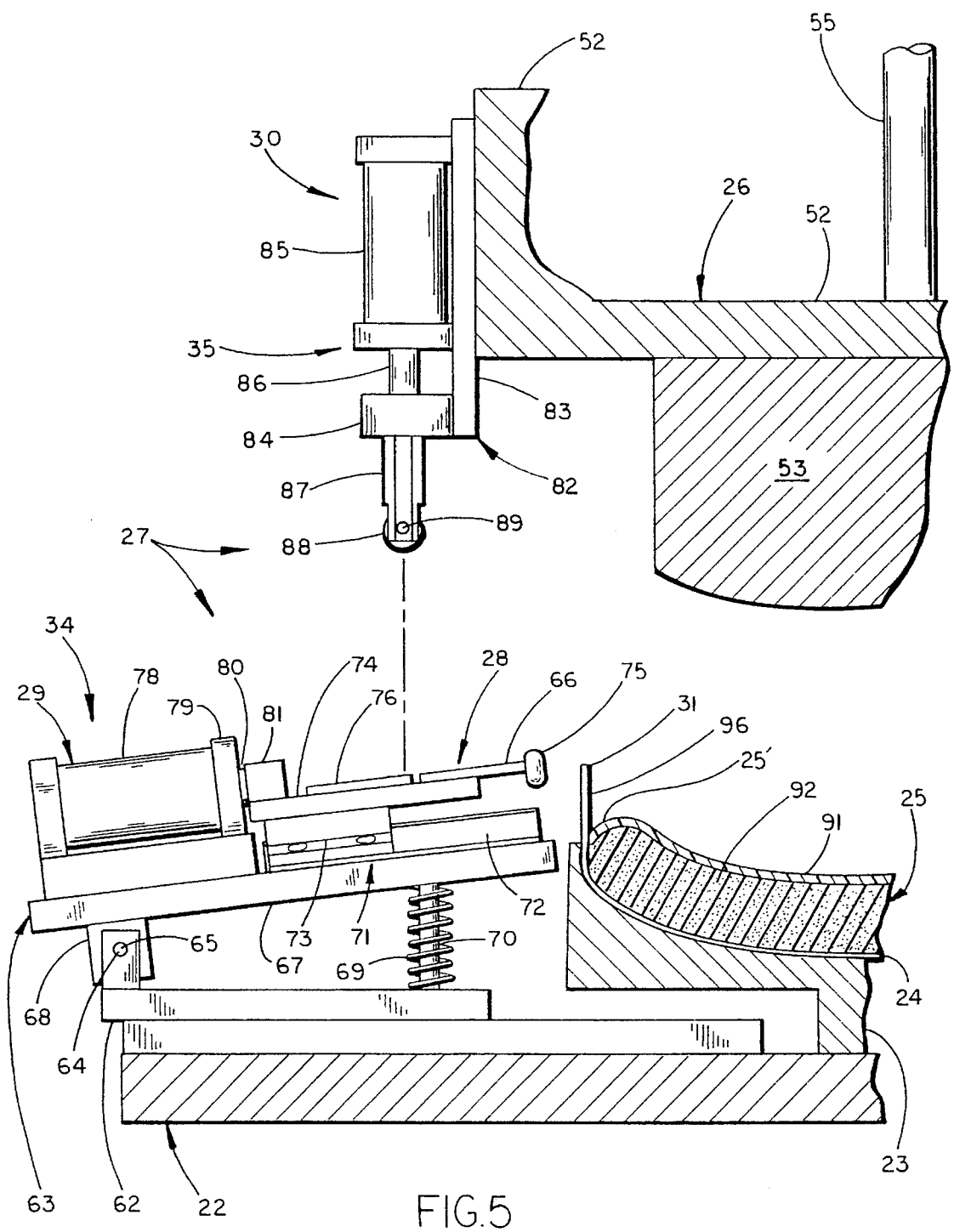
FIG. 5 is an enlarged fragmentary side view of one of the edge fold blade assemblies and the adjacent structure of the upholstering machine and furniture article, the clamp being shown in a raised position like FIG. 3.

Each subassembly 34 (FIG. 5) of edge fold assembly 27 includes a base 62 attached to work-supporting plate 22. An arm 63 is pivotally mounted to base 62 by a pivot pin 64. It is contemplated that base 62 will be oriented so that the axis of rotation 65 will be generally parallel the end 66 of edge fold blade 28 and further generally parallel the section 25' of substrate 25 adjacent the corresponding edge fold blade 28. Arm 63 includes a bottom surface 67, and a pivot block 68 is attached to bottom surface 67 for pivotally supporting pivot pin 64. A coil spring 69 is compressed between bottom plate 67 and base 62 on a rod 70. Spring 69 biases arm 63 to a normally raised position (FIG. 5).

A linear bearing 71 (FIG. 5) on subassembly 34 includes a guide block 72 fixedly mounted on bottom plate 67 and a sled 73 slideably engaging guide block 72. A mounting plate 74 is secured to sled 73, and an edge fold blade 28 is secured to mounting 73. Edge fold blade 28 includes a pillow-shaped head 75 that extends laterally from blade 28 that is configured to rub fabric edges 31 onto substrate 25. A hardened wear plate 76 is attached to mounting plate 74 for engagement by clamp mounted subassembly 35 to control the pivoting motion of arm 63, as discussed below. Actuator 29 includes a cylinder 78 secured to a bracket 79 on mounting plate 74 and an extendable rod 80 operably mounted in cylinder 78. Rod 80 includes a connector 81 that attaches to mounting plate 74 to operate sled 73.

Clamp mounted subassembly 35 includes an L-shaped bracket 82 having a first leg 83 attached to platen-like structure 52, and a second leg 84 extending perpendicularly to first leg 83. Actuator 30 includes a cylinder 85 attached to first leg 83, and an extendable rod 86 that extends toward second leg 84. Second leg 84 includes a hex-shaped hole, and a hex-shaped shaft 87 extends from rod 86 non-rotatably through the hole. A roller 88 for engaging wear plate 76 is secured to the end of shaft 87 on a pivot pin 89. Pivot pin 89 defines an axis of rotation that is perpendicular to the direction of extension of edge fold blade 28 and that is parallel axis 65 on subassembly 34. Due to hex-shaped shaft 87 and the mating hole in second leg 84, the roller 88 always maintains the correct orientation.

Figure 7:
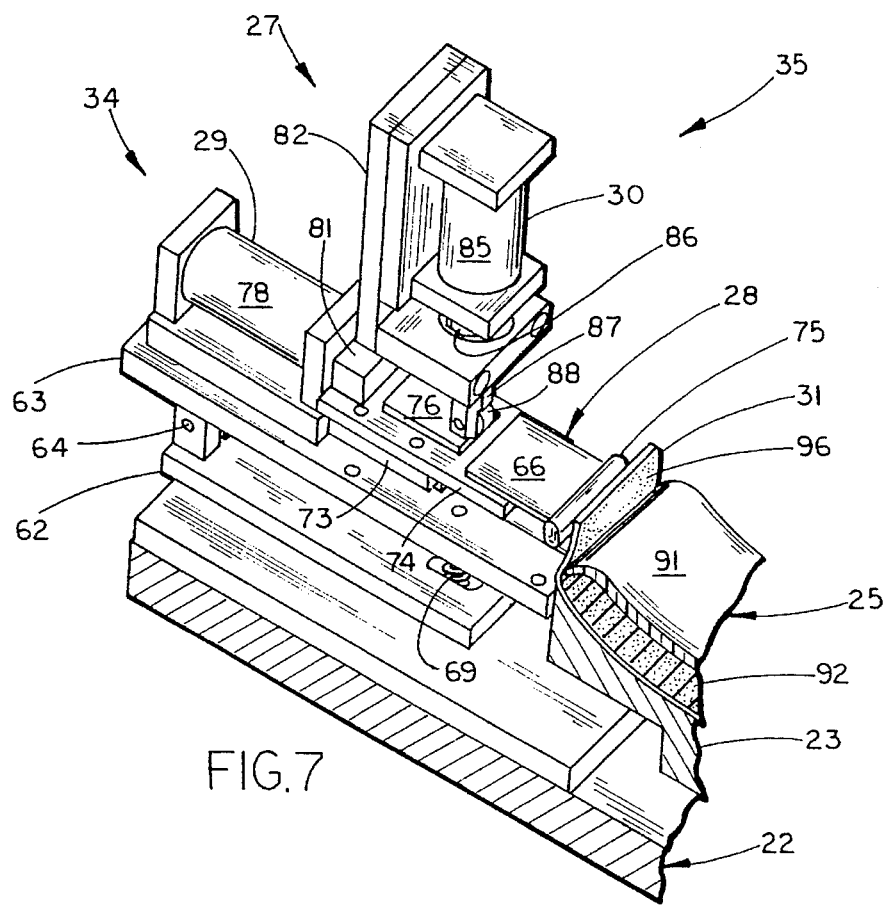
FIG. 7 is a fragmentary perspective view, partially in cross section, showing the edge fold blade assembly, as shown in FIG. 6.

As clamp 26 is lowered (FIGS. 6—7), rod 86 of actuator 30 is extended so that roller 88 engages wear plate 76. This causes arm 63 to pivot downwardly against the bias of spring 69 to a position where edge fold blade 28 is oriented toward an edge of substrate 25. Specifically, substrate 25 includes a molded structural panel 91 and a mating cushion 92. When clamp 26 is initially lowered, the pillow-shaped head 75 of edge fold blade 28 is located generally proximate the edge 93 of molded structural pan 91.

Figure 8:
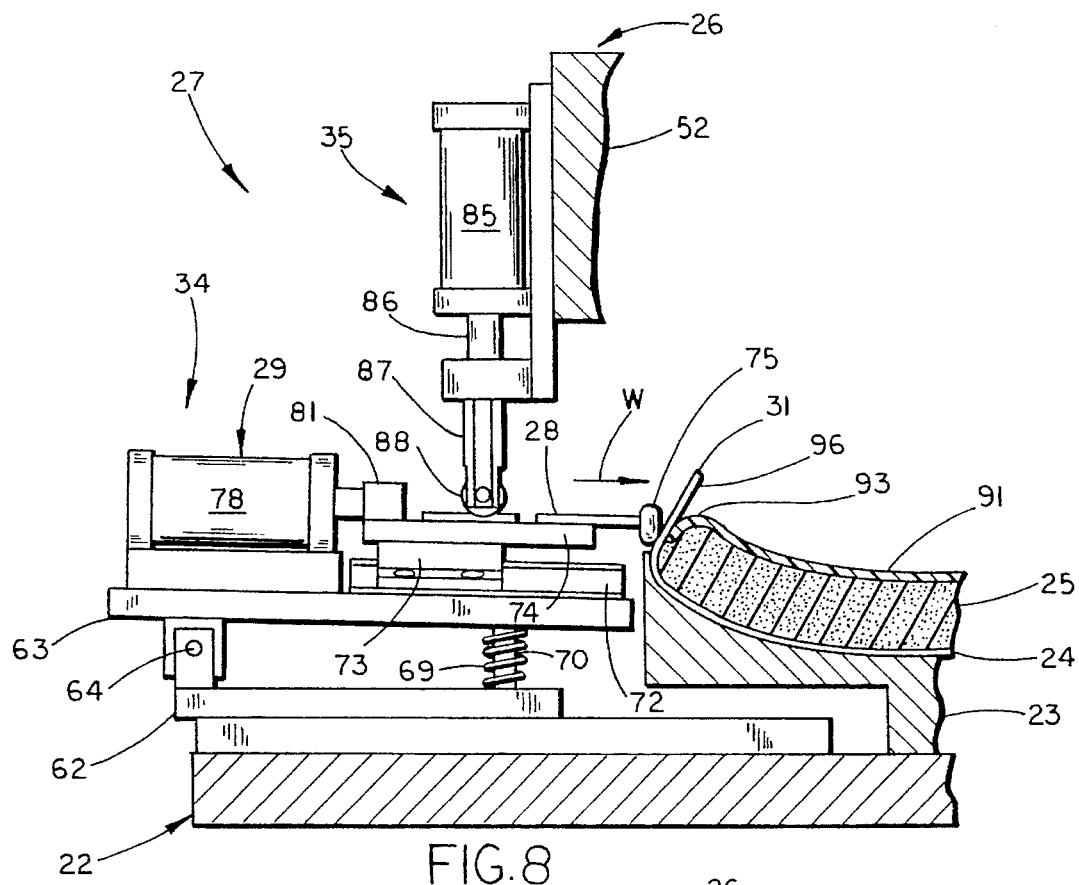
FIG. 8 is an enlarged fragmentary side view of the edge fold blade assembly shown in FIG. 6, the edge fold blade being shown in the extended position as it initially engages the fabric and substrate of the furniture article.
Figure 9:
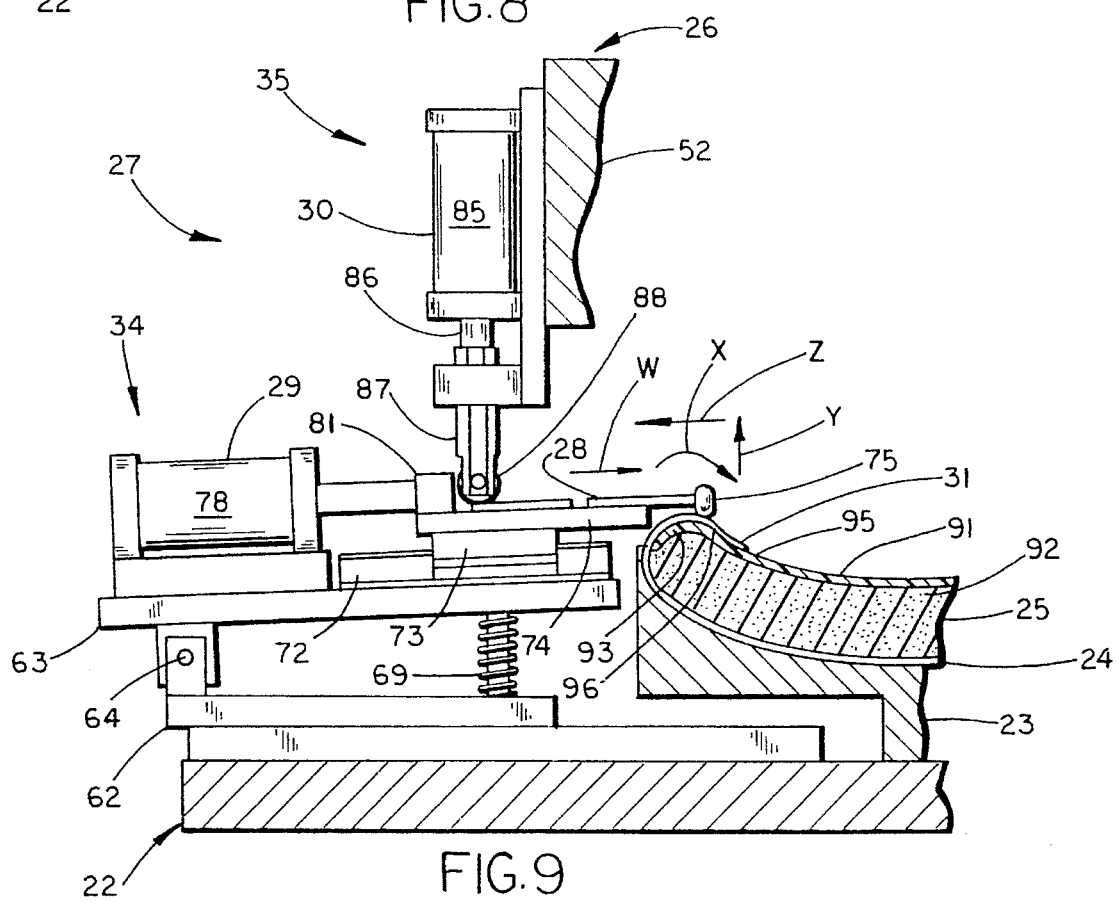
FIG. 9 is an enlarged fragmentary side view of the one edge fold blade assembly shown in FIG. 8, the edge fold blade being shown about midway through the rubbing/extending movement of its cycle.
Figure 10:
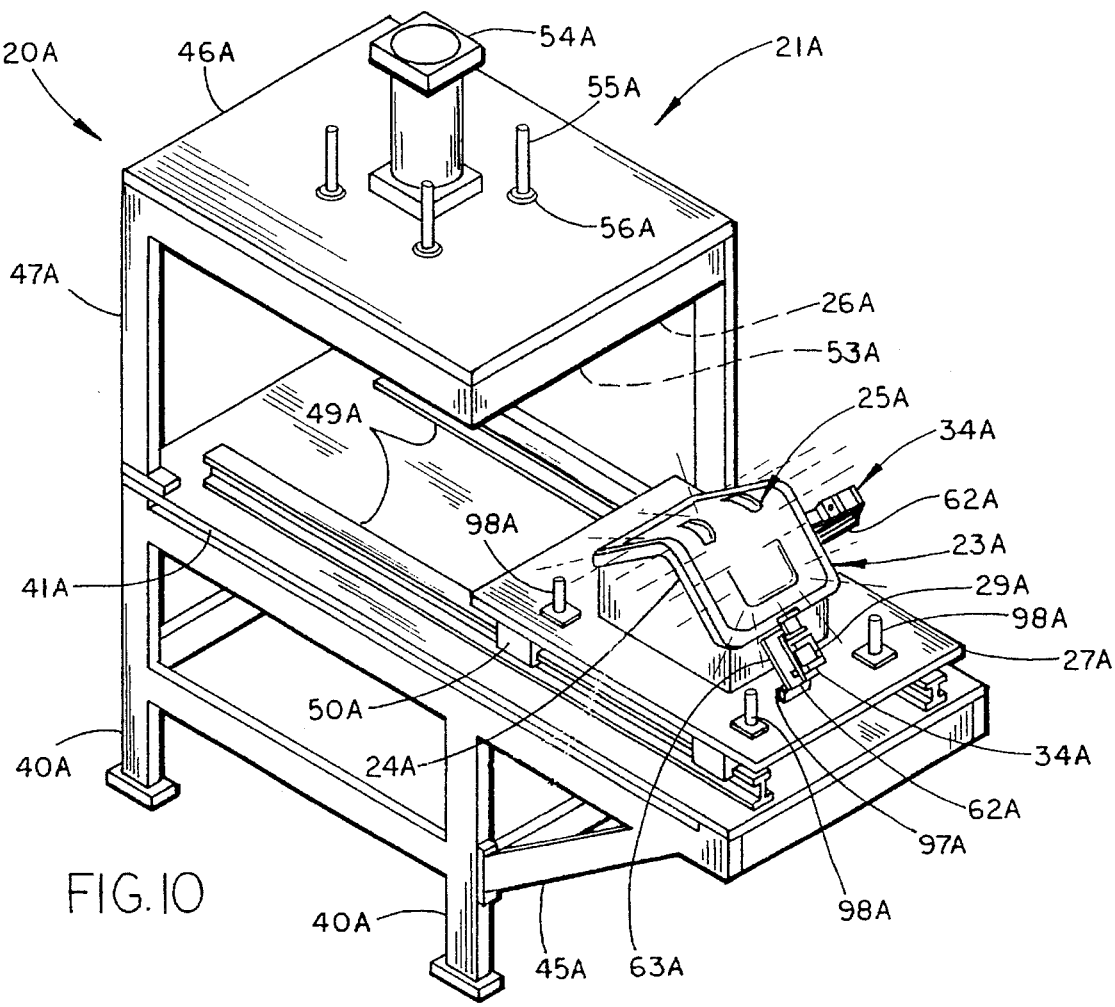
FIG. 10 is a second preferred embodiment of the upholstering apparatus, the nest being configured to receive a chair substrate including a chair shell defining a back and a seat.
Figure 11:
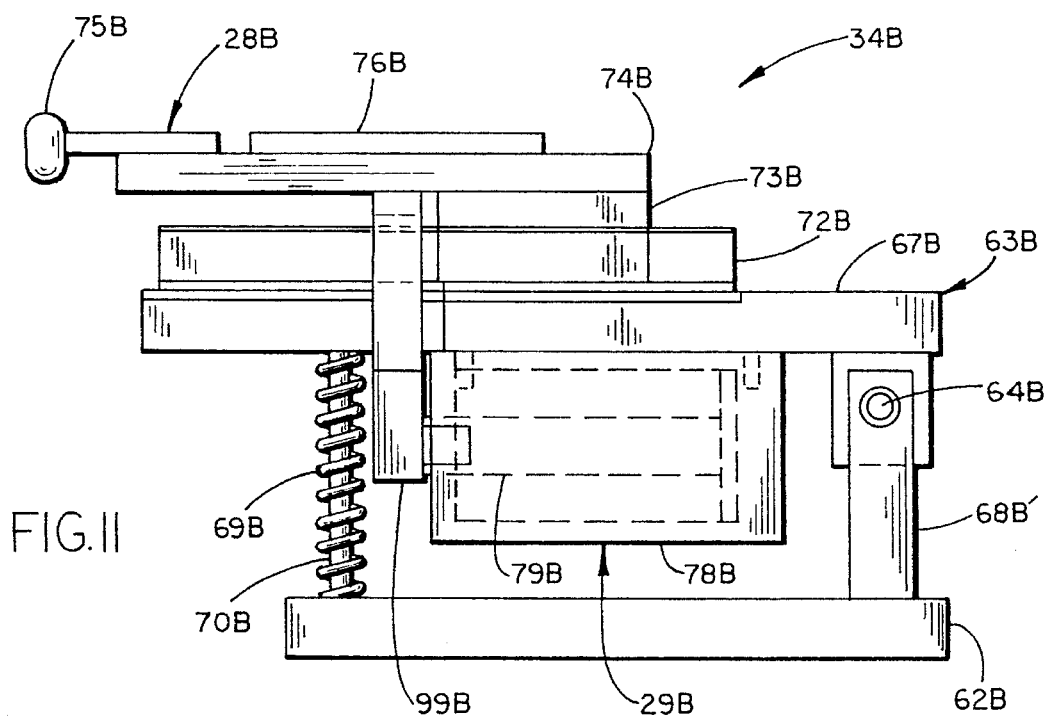
FIG. 11 is a third preferred embodiment edge fold blade assembly, the blade assembly having a relocated actuator.
Figure 20:
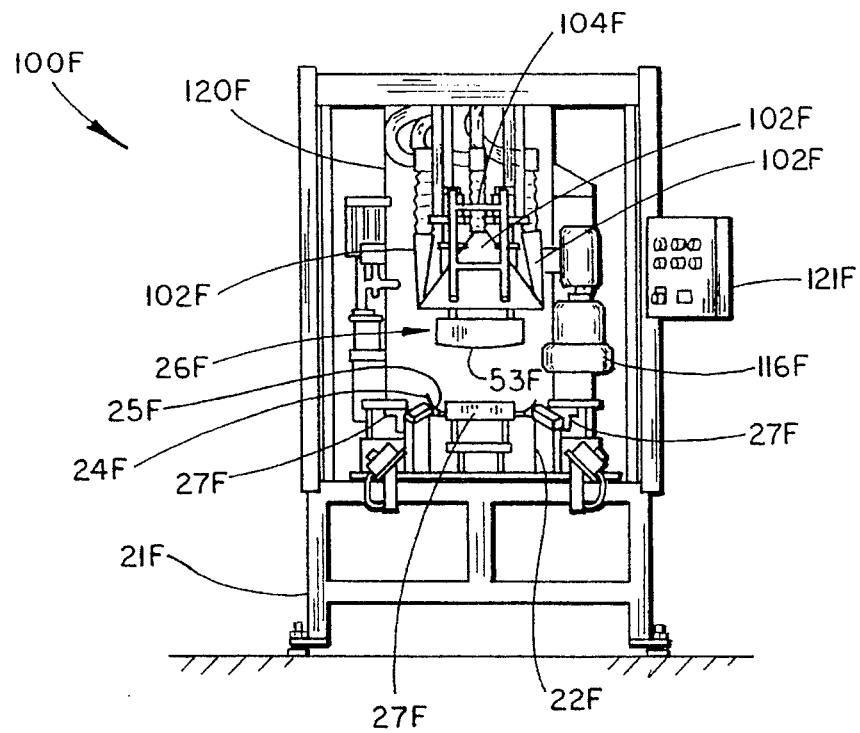
FIG. 20 is an elevational front view of a seventh preferred embodiment upholstering apparatus, the apparatus including hot air ducts and dispensers for heating a strip along a back surface edge of a substrate held by the apparatus, the hot air deflector and the clamp being in a raised position.
Figure 21:
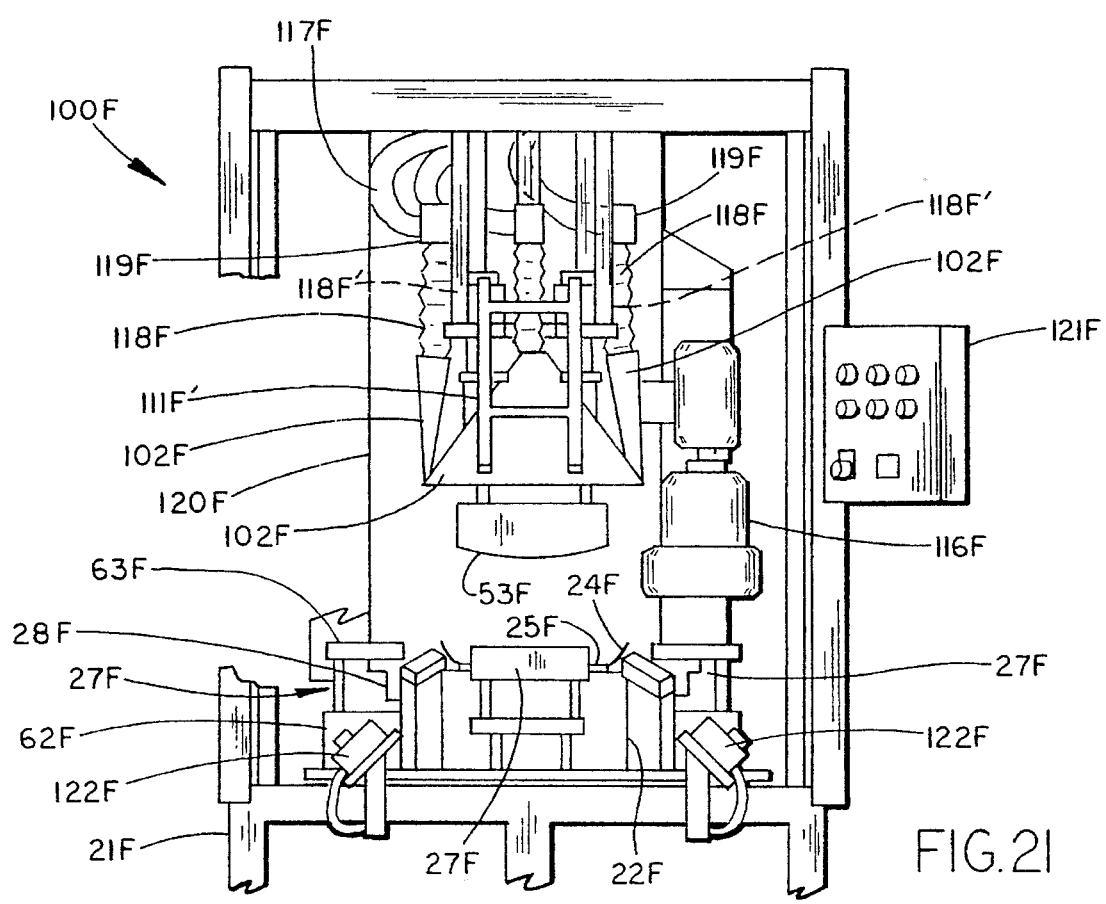
FIG. 21 is an enlarged elevational view, partially broken away, showing the upholstering apparatus shown in FIG. 20.
Figure 24:
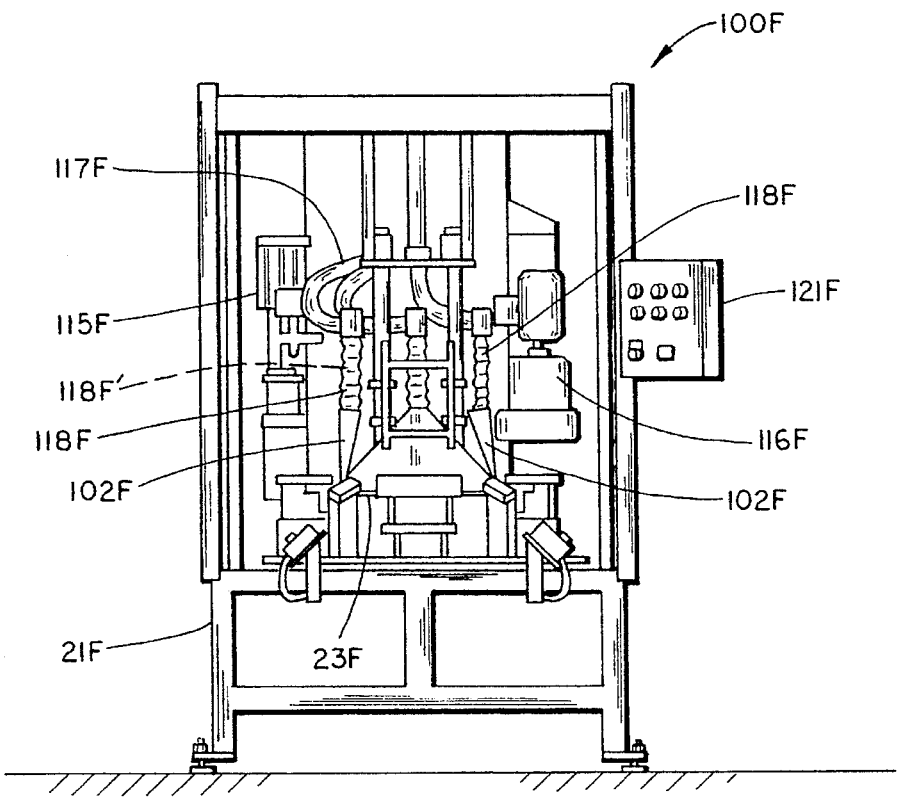
FIG. 24 is an elevational front view of the upholstering apparatus shown in FIG. 22, the clamp being in the clamping position, the hot air dispenser being in the lowered heating position for heating the edges of a part.
Figure 25:
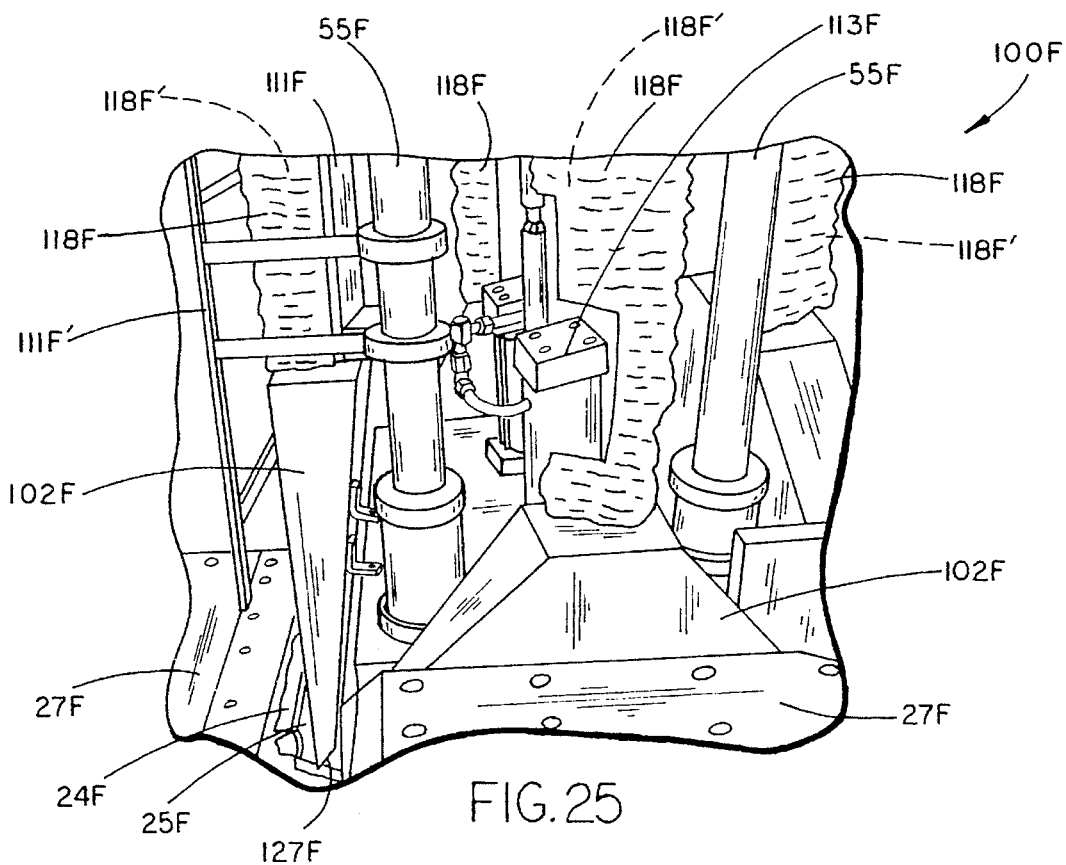
FIG. 25 is an enlarged fragmentary perspective view of the right side of the. clamp including a hot air dispenser.

As edge fold blade 28 is extended laterally by actuator 29 (FIG. 8), head 75 initially moves along a path "W" into contact with fabric edge 31 and presses fabric edge 31 against edge 93 of molded structural pan 91. As edge fold blade 28 is further extended (FIG. 9), actuators 29 and 30 cause head 75 of edge fold blade 28 to move along the path "X" perpendicularly around the edge 93 of molded structural pan 91 onto the back surface 95 of pan 91. This rubs fabric edge 31 into adhering contact with pan 91 while maintaining frictional engagement and thus a generally constant tension on fabric 24. The adhesive 96 on fabric edge 31 can be applied in many different ways, such as by application of a tacky contact adhesive sprayed onto fabric edge 31, or by use of a sheet of adhesive laying on fabric 24 that has been recently heated. Once edge fold blade 28 has been fully extended, actuator 30 retracts rod 86, causing edge fold blade 28 to lift along path "Y" due to the bias of spring 69.

When clamp 26 is initially lowered (FIG. 6), it engages a stop 98 on work-supporting plate 22. Thus, clamp 26 always travels a predetermined distance so that the structural member 91 is always at the exact height for the edge fold blades 28. Specifically, a plurality of stops 98 are used to assure a square and accurate lowered position of clamp 26. As clamp 26 reaches the lowered position, fixture 53 engages and compresses cushion 92 and thus accurately locates structural panel 91 relative to clamp 26. Since subassembly 35 is mounted to clamp 26 and is accurately located relative to fixture 53, the exact position of roller 88 to edge fold blade 28 and to substrate 25 is established. Thus, the position of edge fold blade 28 to the perimeter and back side of substrate 25 is repeatably, consistently and very accurately established. This allows upholstering apparatus 20 to provide a very repeatable and an accurate rubbing/frictional wiping action despite dimensional and physical variations in substrate 25 (including cushion 92 and structural polymeric part 91) and fabric 24. Each of the edge fold blades (28) are configured to conform to the shape of the substrate edge that it engages. Once clamp 26 is lifted (FIG. 9, motion "Y"), actuator 29 then retracts rod 80 causing edge fold blade 28 to move to a retracted position along path "Z". Thereafter, work-supporting plate 22 is moved to the extended unload position so that the furniture article 24/25 can be removed and a new fabric 24 and substrate 25 can be placed on nest 23.

Modified upholstering apparatus and edge fold subassemblies are shown in FIGS. 10–32 and 36–37. In each upholstering apparatus and edge fold subassembly, to reduce redundant discussion, identical or comparable features to apparatus 20 and edge fold subassembly 34 are identified with the same numbers plus the letters "A," "B," "C," and etc.

Upholstering apparatus 20A (FIG. 10) is modified to include a generally L-shaped nest 23A. The mating locating fixture 53A on clamp 26A is similarly modified to matingly engage nest 23A and compress fabric 24A anti substrate 25A against nest 23A. Stops 98A are provided on work-supporting plate 27A to control the maximum extension of clamp 26A. The base 62A of each edge fold subassembly 34A is secured at an optimal angle to work-supporting plate 27A by bracketry 97A so that arm 63A pivots and also actuators 29A extend at optimal angles relative to the adjacent section of nest 23A and substrate 25A.

Edge fold subassembly 34B (FIG. 11) includes an actuator 29B mounted under arm plate 67B between base 62B and arm 63B for extending edge fold blade 28B. Actuator cylinder 78B is mounted to arm bottom plate 67B, and a Y-shaped connector 99B interconnects extendable rod 79B to edge fold mounting plate 74B. Pivot block 68B' on base 62B is extended in length to make room under base 62B for actuator 29B. Coil spring 69B extends between base 62B and arm 63B and biases arm 63B upwardly. A wear plate 76B is located on mounting plate 74B for engagement by a roller on a clamp mounted subassembly (see roller 88 on subassembly 30, FIG. 6): Alternatively, the vertical rotational movement of arm 63B can be controlled by an actuator that replaces spring 69B, or by an actuator that works in tandem with spring 69B. Notably, it is contemplated that numerous edge fold assembly constructions are possible.

An alternative edge fold assembly 34C (FIGS. 12–13) is not unlike edge fold assembly 34, but edge fold blade 28C includes relatively-sharply-cornered ribs 170C on its undersurface 171C defining rounded grooves 172C therebetween. The ribs 170C are configured to slideably grip the sheet material as it is being applied to a substrate so as to control the wrinkles in the sheet material. This arrangement is particularly advantageous around corners of a substrate or structural member since random and irregular wrinkles in sheet materials wrapped onto three dimensional contoured substrates are not usually visually attractive.

Another alternative edge fold assembly 34D (FIG. 14) is also not unlike edge fold assembly 34, but edge fold blade 28D includes an undercut 175D forming a configured surface which can assist in pressing material against an irregular surface having a shape corresponding to edge fold blade 28D including undercut 175D.

An edge fold assembly 34E (FIGS. 15–18) includes a "primary" edge fold blade 28E generally identical to edge fold blade 28C. In particular, edge fold blade 28E includes ribs 170E and grooves 171E (FIG. 19). Linear slide bearing 71E, which supports edge fold blade 28E, includes a guide block 72E and a sled 73E that slideably engages guide block 72E (FIG. 18). A secondary edge fold blade assembly 177E' is operably attached to the top surface of edge fold blade 28E by an upright bracket 178E'. Bracket 178E' includes an angled mounting plate 179E', and a reinforcement web 180E'. Secondary edge fold blade assembly 177E' includes a linear slide bearing 71E', which comprises a slide block 72E' and a sled 73E' that slideably engages slide block 72E'. An actuator 29E' is secured to slide block 72E', and includes an extendable rod 80E' operably connected to sled 73E'. An edge fold blade 28E' is supported in cantilever from sled 73E'. The sheet-material-engaging end 75E' (FIG. 19) of edge fold blade 28E' includes ribs 170E' defining grooves 171E'. Actuator 29E' can be made independently actuatable separately from actuator 29E such that an optimal edge folding sequence/operation can be accomplished. Secondary edge fold blade assembly 177E' is particularly useful where there is limited space around the substrate, such as at the corners of a generally rectangular substrate like a chair seat pan. Reference is made to the apparatus 100F discussed below, which includes hot air deflectors around the substrate that limit availability of space around a substrate.

A modified upholstering apparatus 100F (FIGS. 20–21) includes a frame 21F, and a work-supporting plate 22F including a nest 23F for supporting a sheet of material 24F and a thermoplastic polymeric substrate member 25F. A plurality of edge fold assemblies 27F are mounted to work support plate 22F around the perimeter of nest 23F. In the embodiment shown, the edge fold assemblies 27F are entirely secured to work support plate 22F to make room for the hot air dispensers 102F discussed below. Specifically, edge fold assemblies 27F (FIG. 21) include a vertically extendable arm 63F mounted on base 62F, and an extendable edge fold blade 28F operably mounted on arm 63F. However, it is to be understood that various arrangements of edge fold assemblies 27F are possible and are contemplated, such as those previously disclosed in this application.

An arrangement of hot air dispensers 102F are located around the perimeter of clamp 26F on a dispenser carrier 104F movably attached to clamp 26F. As shown in FIGS. 23 and 23A, by applying focused hot air toward the strips 106F along the perimeter of the back side 107F of polymeric substrate member 25F, a film of fluidized semi-melted material 108F is formed. The edge 109F of material 24F is frictionally slidingly wiped onto substrate member 25F and then is pressed onto fluidized melted material 108F so that the fluidized material 108F chemically and mechanically bonds to the edge 109F as the fluidized material 108F cools and resolidifies. Edge fold assemblies 27F press material 24F against substrate member 25F with a force of about 15 lbs./liner inch and for about 20 seconds.

Structural member 25F (FIG. 23A) is made of a thermoplastic polypropylene or similar re-meltable injection moldable polymeric material. By blowing focused hot air onto the back side 107F of structural member 25F for about 6–10 seconds at about 325° F.–600° F., or preferably about 500° F. for polypropylene, a melted fluidized film 108F is formed on the surface of back side 107F in a desired pattern. By carefully controlling the length of heating time, the area of heating, and the uniformity of heating, the fluidized film 108F will chemically adhere and mechanically bond to sheet material 24F pressed thereagainst as film 108F cools and resolidifies. Heated bands of fluidized material 108F in the range of about ⅜ wide have successfully bonded sheet material 24F to substrate 25F. The narrow bonds reduce the tendency of the heat to cause surface defects in sheet material 24F on the front side of structural member 25F. However, it is noted that wider bands, higher heats and longer heat times may be required in some applications and for some substrate materials.

Clamp 26F (FIG. 23) includes a locating fixture 53F for holding structural member 25F securely in position on nest 23F. Locating fixture 53F and/or nest 23F can be made from aluminum or the like to draw heat away from a substrate to assist in the cooling process, which can also reduce the tendency to show defects on the front side of the structural member 25F. An arrangement of four hot air dispensers 102F are located around a clamp platen 52F, and are supported thereon by dispenser carrying H-shaped bracketry 111F (FIG. 22). Bracketry 111F and secondary bracketry 111F' (FIG. 23) is operably attached to a clamp platen 52F by actuators 113F. Actuators 113F are mounted to clamp platen 52F and movably support hot air dispensers 102F for movement between a raised position (shown in solid lines in FIG. 23) and a lowered position (shown in phantom lines in FIG. 23). By actuating actuator 113F, hot air dispensers 102F are moved between the extended substrate strip heating position (FIG. 24) and the retracted position (FIGS. 22–23). Fixture support bars 114F extend from platen-like structure 52F below clamp plate 52F to hold fixture 53F at a desired height. A stabilizer 112F holds guide rods 55F at a desired spacing, and includes bushings 112F' for slideably receiving rods 55F.

A low volume blower 115F (FIG. 22) and a high volume blower 116F are operably connected to hot air dispensers 102F by flexible tubes 117F, rigid tube 119F, and insulated heater-containing tube 118F. A heater 118F' is positioned in tube 118F for heating air that passes therethrough. The low volume blower 115F moves air at a sufficient volume to keep the hot air dispensers 102F at or near an operating temperature (which volume is about 53 cfm for an 80 inch perimeter part, for example), and the high volume blower 116F (which volume is about 206 cfm for an 80 inch perimeter part) is controlled to operate immediately before and during the heating cycle of apparatus 100F when hot air dispensers 102F are in the lowered heating position. The blowers 115F and 116F move air at about 260 cfm at maximum combined volume output for a perimeter of an 80 inch perimeter, but it is noted that higher or lower air volumes can be used as required for particular applications. Heaters 103F are positioned downstream from blowers 115F and 116F for heating, and insulation is provided around tubes 117F, 118F and 119F as desired. Heaters 103F are thermostatically controlled by a controller in control panel 120F on upholstering apparatus 100F. A station control box 121F and palm/hand buttons 122F are operably connected to the controller 120F for controlling apparatus 100F.

Hot air dispensers 102F (FIGS. 26–29) each include a shroud 125F extending from a hose connector 126F. Shroud 125F defines a thin wide outlet opening 127F for dispensing hot air 128F onto the strip 106F on the back side of polymeric structural member 25F. An apertured distributer 129F including apertures 130F and angled baffles 131F is located inside shroud 125F. Apertured distributer 129F and baffles 131F create air turbulence and also create a more even distribution of uniformly heated air within shroud 125F as the hot air passes to outlet opening 127F. Notably, various hot air dispensers 102F can be used, such as hot air dispenser 102F' (FIG. 30) which includes a laterally facing outlet opening 127F'.

Three exemplary parts 25F', 25F" and 25F''' manufactured by use of apparatus 100F are shown in FIGS. 33–35, respectively. Part 25F' discloses a laminar chair seat assembly including a foam 132F bonded to a polypropylene substrate 133F having a boss 134F, and a semi-porous polypropylene-backed fabric 135F with edges 31F bonded to resolidified, previously fluidized polypropylene material 108F. Preferably, the sheet material (i.e. fabric 135F or the like) is backed with the same material or a compatible material as the substrate to promote better adhesion. Part 25F" discloses a laminar automotive door panel assembly including a thermoplastic substrate or structural member 136F having an attachment flange 137F, and an upholstery material 138F bonded to resolidified, previously fluidized material 108F. Part 25F''' discloses a laminar automotive door panel assembly including a thermoplastic structural member 139F having a reinforcement rib 140F and a perforated vinyl material 141F bonded to resolidified, previously fluidized material 108F. An enlarged fragmentary cross-sectional view of part 25F" is shown in FIG. 23A, and is illustrative of the bonded edge. It is noted that a similar melted/resolidified bond can also be made on the front of structural member 136F to adhere the sheet material to the face of structural member 136F.

Heating apparatus 150G (FIGS. 34–35) includes an infrared element 151G and parabolic reflector 152F for heating and forming a melted fluidized layer of material 153G on the back of a polymeric structural member 154G. Notably, apparatus 150G allows fabric or sheet material to be adhered to structural member 154G without the use of adhesives, thus providing significant savings in material cost and labor. Further, the energy consumption of infrared element 151G is much lower than the energy consumption for the "hot air" type apparatus 100F, discussed above.

More particularly, apparatus 150G includes a work support 155G for supporting structural member 154G, and a linear bearing 156G. An actuator 157G is slideably mounted on bearing 156G, and includes a cylinder block 157G and an extendable rod 158G. Rod 158G is connected to a bracket 159G on work support 155G. An arm 160G is attached to cylinder block 157G and extends in cantilever over structural member 154G on work support 155G. A housing 161G is adjustably supported on arm 160G by a bracket 162G. Housing 161G defines a chamber 162G in which parabolic reflector 152G and infrared element 151G are positioned. By operating actuator 157G, infrared element 151G is moved across structural member 154G at a desired time and with a desired movement. By controlling the velocity of movement in proportion to the infrared light generated by infrared element 151G, a layer of fluidized material 153G of desired thickness and viscosity can be created. This allows a sheet of material to be pressed onto structural member 154G into adhering contact, without use of any adhesive. It is contemplated that infrared element 151G can be used to heat a complete surface, or to heat selected strips or bands. The low energy consumption and high efficiency of the infrared heaters makes this arrangement provide considerable energy savings over prior art known adhesive-type bonding systems that require heat or baking/curing. Further, there are minimal emissions from this infrared heating system since there is no adhesive carrier or byproduct fumes, thus saving capital investment in emissions control systems and also reducing a potential work hazard.

Thus, multiple embodiments of upholstering apparatus for attaching sheet material to a structural member are shown. In one aspect, an edge ford assembly arrangement is provided where a first subassembly is located on a work support, and a second subassembly is located on a clamp for engaging the first subassembly to provide an articulating motion to an edge fold blade. This embodiment is particularly adapted for use with substrates incorporating foam, where dimensional variations and physical property variations can cause problems in an automated edge wrapping/folding process. In another embodiment, a hot air dispenser system is used with an edge folding upholstering apparatus to eliminate the use of adhesive for adhering sheet material to the structural member. In yet another embodiment, infrared heaters are used to reduce the energy consumption where fluidizing a film on the structural member for adhering sheet material directly to the structural member. In all embodiments, the need for staples and other attachments are eliminated, although staples can be used to supplement the holding force if desired. Further, the "hot air" type embodiment and the "infrared" type embodiment greatly reduce or eliminate emissions.

In the foregoing description, it will be readily appreciated by those skilled in the art that modifications may be made to the invention without departing from the spirit of the invention disclosed herein. Such modifications are to be considered as covered by the appended claims, including concepts encompassed under the Doctrine of Equivalents.

The embodiments of the invention in which an exclusive property or privilege is claimed are defined as follows:

1. An upholstering apparatus comprising:

a support for supporting a polymeric structural member;

a clamp configured to hold the polymeric structural member on the support;

a heater configured to rapidly heat a surface of the polymeric structural member to a fluid state to form a film of fluidized material on the surface, one of said support and said heater being movably supported for movement between a heating position wherein the heater is located at least partially over the support and a polymeric structural member supported on the support, and a retracted position;

an edge fold blade for pressing portions of sheet material against the surface of the polymeric structural member so that the fluidized material of the polymeric structural member adheres to the sheet material as fluidized material on the surface solidifies from the fluid state; and said heater including a forced air dispenser for focusing heated air onto a particular portion of the surface of the polymeric structural member, said forced air dispenser including a generally triangularly-shaped shroud having a wide end positioned proximate a perimeter of said support when in said heating position.

2. An upholstering apparatus as defined in claim 1 wherein said forced air dispenser includes one of an apertured distributor and baffles positioned within said shroud in the flow of the heated air to evenly distribute the heated air to the wide end of the shroud.

3. An upholstering apparatus as defined in claim 1 wherein said heater is operably mounted to said clamp.

4. An upholstering apparatus as defined in claim 3 wherein said support includes a nest for mateably supporting the polymeric structural member.

5. An upholstering apparatus as defined in claim 4 wherein said edge fold blade is operably connected to said support.

6. An upholstering apparatus as defined in claim 5 including a first actuator for operably moving said clamp and a second actuator for operably moving said heater.

7. An upholstering apparatus as defined in claim 6 including a controller operably connected to said first and second actuators for operating said first and second actuators.

8. An upholstering apparatus as defined in claim 7 including a plurality of said edge fold blades.

9. An upholstering apparatus comprising:

a support for supporting a polymeric structural member;

a clamp configured to hold the polymeric structural member on the support;

a heater configured to rapidly heat a surface of the polymeric structural member to a fluid state to form a film of fluidized material on the surface, the heater including a shroud having an end defining a thin band, one of said support and said heater being movably supported for movement between a heating position wherein the wide end of the shroud is located proximate of a polymeric structural member supported on the support, and a retracted position; and an edge fold blade for pressing portions of a sheet material against the surface of the polymeric structural member so that the fluidized material of the polymeric structural member adheres to the sheet material as the film of fluidized material on the surface solidifies from the fluid state.

10. An upholstering apparatus as defined in claim 9 wherein the end of the shroud is elongated and is located proximate a perimeter of the polymeric structural member when the heater is in the heating position.

11. An upholstering system comprising:

a polymeric structural member and a decorative sheet having interfacing surfaces characterized by an absence of an adhesive on or between the interfacing surfaces; and an apparatus including:

a support for supporting the polymeric structural member;

a heater configured to rapidly heat an elongated strip on a surface of the polymeric structural member to a fluid state to form a film of fluidized material on the surface of the polymeric structural member without heating the polymeric structural member to a temperature at which the polymeric structural member will deform, one of said support and said heater being movably supported for movement between a heating position wherein the heater is located at least partially over the support and a polymeric structural member supported on the support, and a retracted position; and an edge fold blade for pressing portions of the sheet against the surface of the polymeric structural member so that the fluidized material of the polymeric structural member adheres to the sheet material as fluidized material on the surface solidifies from the fluid state.

12. An upholstering apparatus comprising:

a support for supporting a polymeric structural member;

a clamp configured to hold the polymeric structural member on the support;

a heater configured to rapidly heat a narrow band along a perimeter surface of the polymeric structural member to a fluid state to form a film of fluidized material on the surface, one of said support and said heater being movably supported for movement between a heating position wherein the heater is located at least partially over the support and a polymeric structural member supported on the support, and a retracted position; and an edge fold blade for pressing portions of sheet material against the surface of the polymeric structural member so that the fluidized material of the polymeric structural member adheres to the sheet material as fluidized material on the surface solidifies from the fluid state.

13. An upholstering apparatus as defined in claim 12 including a shroud for focussing thermal energy from the heater on the narrow band along a perimeter of the surface so that the thermal energy heats substantially only the narrow band.

* * * * *